(12) United States Patent
Abhishek Raja et al.

(10) Patent No.: US 10,552,338 B2
(45) Date of Patent: Feb. 4, 2020

(54) TECHNIQUE FOR EFFICIENT UTILISATION OF AN ADDRESS TRANSLATION CACHE

(71) Applicant: ARM Limited, Cambridge (GB)

(72) Inventors: Abhishek Raja, Austin, TX (US); Michael Filippo, Driftwood, TX (US)

(73) Assignee: ARM Limited, Cambridge (GB)

( * ) Notice: Subject to any disclaimer, the term of this patent is extended or adjusted under 35 U.S.C. 154(b) by 180 days.

(21) Appl. No.: 15/437,581

(22) Filed: Feb. 21, 2017

(65) Prior Publication Data

US 2018/0239714 A1    Aug. 23, 2018

(51) Int. Cl.
*G06F 12/1027* (2016.01)
*G06F 12/0864* (2016.01)
*G06F 12/1009* (2016.01)

(52) U.S. Cl.
CPC ...... *G06F 12/1027* (2013.01); *G06F 12/0864* (2013.01); *G06F 12/1009* (2013.01); *G06F 2212/6032* (2013.04)

(58) Field of Classification Search
None
See application file for complete search history.

(56) References Cited

U.S. PATENT DOCUMENTS

| 9,690,714 B1 * | 6/2017 | Sites | G06F 12/1009 |
| 2009/0292899 A1 * | 11/2009 | Mansell | G06F 12/1009 711/207 |
| 2018/0181496 A1 * | 6/2018 | King | G06F 12/1027 |

OTHER PUBLICATIONS

Jung-Hoon Lee et al., "High Performance and Low Power TLB Structure", GyeongSang National University (Year: 2013).*
Thorid Selén, "Reorganisation in the Skewed-Associative TLB", Uppsala University (Year: 2004).*

* cited by examiner

*Primary Examiner* — Charles Rones
*Assistant Examiner* — Jonah C Krieger
(74) *Attorney, Agent, or Firm* — Nixon & Vanderhye P.C.

(57) ABSTRACT

An apparatus and method are provided for making efficient use of address translation cache resources. The apparatus has an address translation cache having a plurality of entries, where each entry is used to store address translation data used when converting a virtual address into a corresponding physical address of a memory system. Each item of address translation data has a page size indication for a page within the memory system that is associated with that address translation data. Allocation circuitry performs an allocation process to determine the address translation data to be stored in each entry. Further, mode control circuitry is used to switch a mode of operation of the apparatus between a non-skewed mode and at least one skewed mode, dependent on a page size analysis operation. The address translation cache is organised as a plurality of portions, and in the non-skewed mode the allocation circuitry is arranged, when performing the allocation process, to permit the address translation data to be allocated to any of the plurality of portions. In contrast, when in the at least one skewed mode, the allocation circuitry is arranged to reserve at least one portion for allocation of address translation data associated with pages of a first page size and at least one other portion for allocation of address translation data associated with pages of a second page size different to the first page size.

20 Claims, 13 Drawing Sheets

FOR ADDRESS TRANSLATION CACHE WITH 512 SETS

EMBODIMENT 1

| | PAGE SIZE | INDEX BITS | COMPARE BITS | TYPE |
|---|---|---|---|---|
| | 4KB | [20:12] | [47:21] | LEAF |
| | 2MB | [29:21] | [47:30] | BLOCK |
| OPTIONAL EXTRA PAGE SIZE | 1GB | [38:30] | [47:39] | BLOCK |

EMBODIMENT 2

| | PAGE SIZE | INDEX BITS | COMPARE BITS | TYPE |
|---|---|---|---|---|
| | 4KB | [20:12] | [47:21] | LEAF |
| | 16KB | [22:14] | [47:23] | COALESCED |
| OPTIONAL EXTRA PAGE SIZE | 64KB | [24:16] | [47:25] | CH SET |

TECHNIQUE FOR EFFICIENT UTILISATION OF AN ADDRESS TRANSLATION CACHE

BACKGROUND

The present technique relates to the efficient utilisation of an address translation cache.

It is known to provide data processing systems which incorporate an address translation cache, such as a translation lookaside buffer (TLB), to store address translation data relating to the translation of, for example, virtual addresses to physical addresses. The address translation data can also provide attribute data regarding the memory accesses being made, such as permission data and memory attributes. Whilst the provision of an address translation cache is useful in improving performance by reducing the number of slow page table walks required, such an address translation cache can occupy significant circuit resources, and accordingly it is desirable to make efficient utilisation of those resources. It is also useful to ensure that a lookup operation performed within the address translation cache can be performed quickly so as to optimise the performance benefits achievable from the use of such an address translation cache.

Each item of address translation data stored within an address translation cache can have an associated page size indication, and one way to seek to increase the effective capacity of an address translation cache is to allow the address translation cache to hold address translation data for more than one page size. However, this can complicate the lookup process used to determine whether the address translation cache holds address translation data for a specified virtual address, and hence can impact performance.

It would be desirable to provide a mechanism that could allow efficient utilisation of an address translation cache without adversely affecting performance.

SUMMARY

In one example configuration there is provided an apparatus comprising: an address translation cache having a plurality of entries, each entry to store address translation data used when converting a virtual address into a corresponding physical address of a memory system, each address translation data having a page size indication for a page within the memory system that is associated with the address translation data; allocation circuitry to perform an allocation process to determine the address translation data to be stored in each entry; and mode control circuitry to switch a mode of operation of the apparatus between a non-skewed mode and at least one skewed mode dependent on a page size analysis operation; the address translation cache being organised as a plurality of portions; wherein in the non-skewed mode the allocation circuitry is arranged, when performing the allocation process, to permit the address translation data to be allocated to any of the plurality of portions; wherein in each of the at least one skewed mode, the allocation circuitry is arranged, when performing the allocation process, to reserve at least one portion for allocation of address translation data associated with pages of a first page size and at least one other portion for allocation of address translation data associated with pages of a second page size different to said first page size.

In another example configuration, there is provided a method of operating an address translation cache having a plurality of entries and organised as a plurality of portions, each entry for storing address translation data used when converting a virtual address into a corresponding physical address of a memory system, each address translation data having a page size indication for a page within the memory system that is associated with the address translation data, the method comprising: performing an allocation process to determine the address translation data to be stored in each entry; and switching a mode of operation of the apparatus between a non-skewed mode and at least one skewed mode dependent on a page size analysis operation; when performing the allocation process whilst in the non-skewed mode, permitting the address translation data to be allocated to any of the plurality of portions; and when performing the allocation process whilst in the at least one skewed mode, reserving at least one portion for allocation of address translation data associated with pages of a first page size and at least one other portion for allocation of address translation data associated with pages of a second page size different to said first page size.

In a yet further example configuration, there is provided an apparatus comprising: address translation cache means for having a plurality of entries, each entry for storing address translation data used when converting a virtual address into a corresponding physical address of a memory system, each address translation data having a page size indication for a page within the memory system that is associated with the address translation data; allocation means for performing an allocation process to determine the address translation data to be stored in each entry; and mode control means for switching a mode of operation of the apparatus between a non-skewed mode and at least one skewed mode dependent on a page size analysis operation; the address translation cache means being organised as a plurality of portions; wherein in the non-skewed mode the allocation means, when performing the allocation process, for permitting the address translation data to be allocated to any of the plurality of portions; wherein in each of the at least one skewed mode, the allocation means, when performing the allocation process, for reserving at least one portion for allocation of address translation data associated with pages of a first page size and at least one other portion for allocation of address translation data associated with pages of a second page size different to said first page size.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
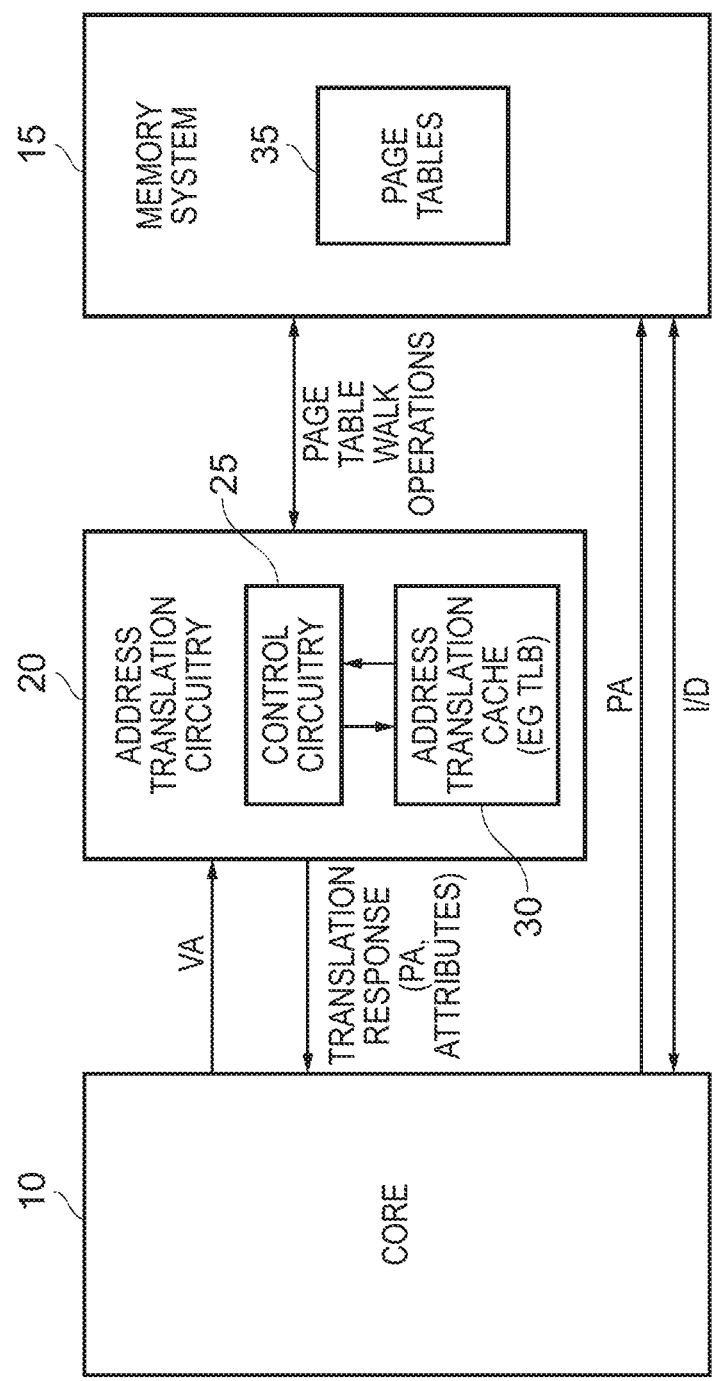
FIG. 1 illustrates a data processing system incorporating an address translation cache in accordance with one embodiment.

Before discussing the embodiments with reference to the accompanying figures, the following description of embodiments is provided.

In one embodiment an apparatus is provided that comprises an address translation cache along with associated allocation circuitry and mode control circuitry. The address translation cache has a plurality of entries, with each entry being used to store address translation data used when converting a virtual address into a corresponding physical address for a memory system. Each item of address translation data has a page size indication for a page within the memory system that is associated with the address translation data. The allocation circuitry is arranged to perform an allocation process to determine the address translation data to be stored in each entry. Further, the mode control circuitry is arranged to switch a mode of operation of the apparatus between a non-skewed mode and at least one skewed mode dependent on a page size analysis operation.

The address translation cache is considered as being organised into a plurality of portions. These portions can take a variety of forms, but in one particular embodiment the address translation cache is an N-way set associative cache and each of the portions comprises a way of the N-way set associative cache. In the non-skewed mode the allocation circuitry is arranged, when performing the allocation process, to permit the address translation data to be allocated to any of the plurality of portions. However, when the apparatus is in the at least one skewed mode, the allocation circuitry is instead arranged, when performing the allocation process, to reserve at least one portion for allocation of address translation data associated with pages of a first page size, and at least one other portion for allocation of address translation data associated with pages of a second page size different to the first page size.

By allowing dynamic switching of the mode of operation of the apparatus dependent on the page size analysis operation, this can allow the address translation cache to be configured for efficient utilisation taking into account the page sizes being accessed in memory. Further, as will be described in more detail below, in some embodiments this can be achieved whilst reducing the potential negative performance impact of accommodating mixed page sizes within the address translation cache.

The allocation circuitry may be arranged to determine, from received translation information, the address translation data to be stored in the allocated entry. Typically, the received translation information will have an associated page size. In one embodiment, in the non-skewed mode, the allocation circuitry is constrained so that it produces the address translation data for the first page size irrespective of the page size associated with the received translation information. As mentioned earlier, in the non-skewed mode, the allocation circuitry permits the address translation data to be allocated to any of the plurality of portions. Hence, in this particular embodiment, there is a great deal of flexibility as to where the generated address translation data is allocated, but all of the items of address translation data stored will relate to the same page size. This significantly simplifies the lookup process, and ensures that the lookup process can be performed quickly to determine whether there is a hit or a miss within the address translation cache.

There are a number of ways in which the allocation circuitry can produce the address translation data from the received translation information. However, in one embodiment, when in the non-skewed mode, in situations where the page size associated with the received translation information is larger than the first page size, the allocation circuitry is arranged to perform a fracturing operation to produce the address translation data for the first page size from the received translation information. Hence, purely by way of example, if for a specified virtual address the received translation information represents a 16 KByte (KB) page, the fracturing operation can be used to generate address translation data for that virtual address that relates to a 4 KB page, with that generated address translation data then being stored within the address translation cache.

The received translation information can be obtained in a variety of ways, but in one embodiment is obtained via a page table walk process. In particular, in one embodiment, if based on a virtual address specified by an associated processing circuit, a hit is not detected within the address translation cache, a page table walk process can be instigated in order to access one or more page tables within memory in order to obtain the required translation information to enable translation of that virtual address into a physical address. From the returned translation information, address translation data to be stored in an entry of the address translation cache can also be determined.

In one embodiment, the apparatus further comprises lookup circuitry that is responsive to a received virtual address to perform a lookup operation within the address translation cache to determine whether address translation data for that virtual address is stored within an entry of the address translation cache. As mentioned earlier, when in an embodiment of the above-mentioned non-skewed mode where all address translation data is generated for the first page size, such a lookup operation can be performed quickly whilst in the non-skewed mode, since the lookup only needs to be performed for a single page size.

However, due to the constraints placed on allocation whilst in the at least one skewed mode, this performance can also be retained when in the at least one skewed mode, since it is possible to perform a number of lookups in parallel for different page sizes. In particular, when the apparatus is in the at least one skewed mode of operation, the lookup circuitry may be arranged to perform in parallel a lookup within the at least one portion that has been reserved for address translation data associated with pages of the first page size, whilst also performing a lookup within the at least one other portion reserved for address translation data associated with pages of the second page size. Because different portions of the address translation cache have been reserved for address translation data with these different page sizes, it is possible for the lookups to proceed in parallel, and hence even though the effective capacity is increased by allowing the storage of address translation data for different pages sizes, this does not have an adverse impact on performance of the lookup operation.

As mentioned earlier, in one embodiment the address translation cache is an N-way set associative cache, and each portion comprises a way of the set associative cache. In such an embodiment, the lookup circuitry may be arranged whilst the apparatus is in the at least one skewed mode of operation, to select a first subset of the bits of the virtual address to identify a set to be subjected to the lookup within said at least one portion for address translation data associated with pages of said first page size, and to select a second subset of the bits of the virtual address to identify a set to be subjected to the lookup within said at least one other portion for address translation data associated with pages of said second page size. Hence, different sets will be identified based on the different index bits used for the different pages sizes, and then for each such page size the lookup will proceed within the ways of the identified set that have been reserved for that page size. Since only one lookup is required in each way, the process can be performed in parallel, and hence performed quickly to determine whether there is a hit or a miss within the address translation cache. The first and second page sizes can be varied dependent on implementation.

However, in one embodiment the first page size is smaller than the second page size. In one particular embodiment, the first page size is the smallest page size supported by the memory system.

As mentioned earlier, the mode control circuitry is able to dynamically switch the apparatus between the non-skewed mode and the at least one skewed mode based on a page size analysis operation. In one embodiment, the mode control circuitry is arranged to perform a monitoring operation that monitors the page sizes associated with multiple instances of the received translation information, as mentioned earlier the received translation information being the information that is received by the allocation circuitry, and from which the address translation data to be stored within the address translation cache is determined. Hence the mode control circuitry can effectively maintain a history of the page sizes that are being accessed, and steer the mode of operation of the address translation cache based on characteristics observed within that history. For example, if most of the pages being accessed are of the first page size, the most efficient use of the address translation cache may be realised by operating in the non-skewed mode. However, if the proportion of page sizes greater than the first page size is relatively high, this may be used to indicate that a switch should be made to one of the at least one skewed modes. In one embodiment, the mode control circuitry may use a heuristic algorithm to determine when to switch between the non-skewed and skewed modes.

When the proportion of page sizes greater than the first page size exceeds a certain level, it may be more efficient to operate the address translation cache in a skewed mode of operation, since the larger page sizes are being used enough to warrant reserving at least one of the ways for storage of address translation data for such page sizes. Hence the effective capacity of the address translation cache is increased, since by accommodating address translation data for larger page sizes, this increases the likelihood that hits will be detected. Further, due to the constraints placed in the at least one skewed mode, a fast lookup can still be performed, and hence any adverse performance impacts are ameliorated.

There are a number of ways in which a history of the pages sizes associated with multiple instances of the received translation information could be maintained. For example, the mode control circuitry could maintain a history within a sliding window of time, so that any received translation information within that time period has its page size information captured within the history information. Alternatively, rather than constraining the history by a time period, the history may relate to page sizes for a certain number of previous instances of the received translation information. Whilst in one embodiment, the allocation circuitry may merely take into account history information about the page sizes associated with previously received translation information when deciding which mode to operate the address translation cache in, in an alternative embodiment it can selectively take into account additional criteria if required. For example, in one embodiment the mode control circuitry may be further arranged, when performing the page size analysis operation, to take into account a history of page sizes associated with items of address translation data for which a hit has been detected within the address translation cache. In one embodiment, this additional consideration can be taken into account when deciding whether to return from a skewed mode of operation to the non-skewed mode of operation. For example, even if the history of page sizes associated with previously received translation information drops below the threshold that would normally cause the address translation cache to be switched back into the non-skewed mode, if a relatively high percentage of hits are still being observed with regards to the larger page sizes cached within the address translation cache, the allocation circuitry may decide to retain the address translation cache within the skewed mode of operation.

In one embodiment, the address translation cache may be directly coupled with an associated processing circuit (such as a processor core). However, in an alternative embodiment, the address translation cache may form a set associative translation lookaside buffer (TLB) for associated processing circuitry, and may be coupled to a fully associative micro-TLB. In response to a virtual address issued by the processing circuitry, the address translation cache may then be accessed in the event of a miss being detected in the micro-TLB. The micro-TLB may be arranged to store address translation data for the page size indicated by the received translation information, independent of whether the allocation circuitry of the address translation cache performs the earlier-mentioned fracturing operation. Hence, even though the set associative address translation cache is constrained to operate in the multiple mode manner discussed earlier, this does not constrain the operation of the micro-TLB, and the micro-TLB can continue to operate in a standard manner.

In one embodiment, the address translation data that is handled in the manner discussed earlier comprises a final level type of address translation data that identifies a full translation form the virtual address to the physical address. In one embodiment, the address translation cache may be configured so that it only stores such final level type address translation data, and hence all entries relate to full translations from the virtual address to the physical address. However, in an alternative embodiment, the address translation cache may be a unified translation cache, such that whilst some entries will store address translation data that identifies a full translation from the virtual address to the physical address, other entries may be arranged to store at least one intermediate level type of address translation data that identifies a partial translation of the virtual address. That partial translation can then be used, in combination with remaining steps of a page table walk process, in order to obtain the full address translation information required to convert a virtual address into a physical address.

When the address translation cache is such a unified translation cache, there are a number of ways in which the allocation circuitry can handle the allocation of intermediate level type address translation data. In one embodiment, the allocation circuitry is arranged to permit the intermediate level type of address translation data to be stored in an allocated entry for the page size of the associated received translation information irrespective of the mode of operation of the apparatus. Hence, for intermediate level type address translation data, there is no constraint on where such intermediate level type address translation data associated with larger pages is stored as compared with intermediate level type address translation data associated with smaller pages.

However, in one embodiment, when the apparatus is in the at least one skewed mode, the at least one other portion that has been reserved for allocation of the final level type of address translation data associated with pages of the second page size is also prevented from being used by the allocation circuitry for the storage of intermediate level type of address translation data. This hence maximises the available entries for storing final level type of address translation data associated with pages of the second page size.

In one embodiment, when in the at last one skewed mode of operation, the allocation circuitry is arranged, when allocating an item of address translation data associated with a page of said second page size, to apply a replacement policy to determine whether to overwrite, within an entry of said at least one other portion, another item of address translation data associated with said second page size, or whether to apply a fracturing operation to produce address translation data for said first page size to be stored within an entry of said at least one other portion. Hence, this allows some flexibility when determining whether to overwrite an existing item of address translation data associated with a second page size or not. The choice can hence be governed by the replacement policy, for example depending on how likely the current occupying address translation data will be used in the future.

In one embodiment, multiple skewed modes may be provided, and the choice of which skewed mode to enter can be taken by the mode control circuitry based on further page analysis criteria. In one embodiment, such multiple skewed modes includes a skewed mode that additionally reserves at least one further portion for allocation of address translation data associated with the pages of a third page size different to the first and second page sizes. Hence, purely by way of example, one way may be reserved for allocation of address translation data associated with 64 KB pages, another way may be reserved for allocation of address translation data associated with 16 KB pages, and the remaining ways may be reserved for allocation of address translation data associated with 4 KB pages.

Whilst in the above embodiments the dynamic switching between non-skewed and skewed modes of operation is performed so as to make efficient utilisation of the address translation cache whilst maintaining high performance lookups, the general approach can also be used taking into account other criteria. For example, in one embodiment, in the non-skewed mode, the allocation circuitry may be arranged to permit the address translation data to be produced for the page size associated with the received translation information and to be allocated to any of the plurality of portions. When the apparatus is in the non-skewed mode of operation, the lookup circuitry may be arranged to perform a series of lookups for address translation data, each lookup assuming a page size different to each other lookup, until either a hit has been detected or a lookup has been performed for each page size. In such an embodiment, preference can be given to increasing the effective capacity of the address translation cache rather than maintaining quick lookup times. Hence, when the time taken by the lookup is not considered to be critical, it would be possible to operate the apparatus in the non-skewed mode, but when it is determined that the timing of the lookup operations is important, the apparatus could switch to a skewed mode of operation, in this particular arrangement the skewed mode having a reduced effective capacity compared with the non-skewed mode.

In a yet further embodiment, a hybrid approach could be taken. For example, in one embodiment, when in the non-skewed mode, the allocation circuitry may be arranged to produce the address translation data for said first page size when the page size associated with the received translation information is one of a plurality of page sizes within a first group of page sizes, and otherwise may be arranged to permit the address translation data to be produced for the page size associated with the received translation information. In accordance with such a technique, for the page sizes within the first group, fracturing may be performed as required in order to produce address translation data of one specified size, but for a page size not in that first group the allocation circuitry will allow the address translation data to be allocated with the page size of the associated received translation information, and during the lookup operation one or more sequential lookups can be performed for such a page size if needed. Purely by way of a specific example, it may be decided when in the non-skewed mode that all received translation information relating to 4 KB, 16 KB or 64 KB pages would be stored as address translation data with an associated page size of 4 KB, but received translation information for a larger page (for example 2 MB) may result in the production of address translation data for that 2 MB page size. During a lookup operation, a lookup could first be performed for a 4 KB page size, and then if necessary a further sequential lookup could be performed for a 2 MB page.

Particular embodiments will now be described with reference to the Figures.

FIG. 1 schematically illustrates a data processing system including a processor core 10 for executing program instructions and for performing data accesses (both instruction fetches and accesses to data to be manipulated) using virtual addresses VA. These virtual addresses are subject to address translation to physical addresses PA by address translation circuitry 20. The physical addresses are used to control access to instructions and data in a memory system 15. The memory system 15 may comprise a memory hierarchy, such as multiple levels of cache memory and a main memory or other non-volatile storage.

As shown in FIG. 1, the address translation circuitry 20 includes an address translation cache 30, which in one example may take the form of a translation lookaside buffer (TLB). The address translation cache 30 has a plurality of entries, where each entry stores address translation data used when converting a virtual address into a corresponding physical address of a memory system. The address translation data is determined by performing page table walk operations in respect of page tables 35 stored within the memory system 15. As will be discussed later with reference to FIG. 3, a multi-level page table walk process may be used in order to obtain, with reference to a final level descriptor, full address translation data enabling a virtual address to be converted into a physical address, and that full address translation data may be stored within the address translation cache 30. Taking the example where the address translation cache is a TLB, a TLB is usually used to store such full address translation data. However, as will be discussed in more detail later, the address translation cache may in one embodiment be a unified address translation cache, allowing not only full address translation data to be stored, but also partial address translation data (also referred to herein as intermediate level address translation data).

As shown schematically in FIG. 1, when the core 10 issues a virtual address to the address translation circuitry 20, the control circuitry can perform a lookup operation within the address translation cache 30 to determine whether a hit is detected within one of the entries of the address translation cache. In one embodiment, the address translation cache has a set associative structure, and certain bits of the virtual address may be used as an index into the address translation cache in order to identify a set, with the entries within that set being reviewed in order to determine whether a hit is detected. If a hit is detected, then a translation response can be returned directly to the processor core 10, this including physical address bits and associated attributes stored within the hit entry within the address translation cache. Based on this information, the core can then generate a physical address to output to the memory system 15 in order to access a required instruction, or data to be manipulated. If a hit is not detected within the address translation cache, the address translation circuitry 20 will initiate a page table walk process in order to access the relevant page tables 35 within the memory system in order to walk through a sequence of descriptors until a final level descriptor is obtained, at which point full address translation data can be determined and an appropriate translation response can then be returned to the core. During this process, one or more entries within the address translation cache 30 can be allocated to store address translation data derived from the accessed descriptors. This is likely to enable a subsequently issued virtual address to result in a hit within the address translation cache, thereby reducing access times.

Figure 2:
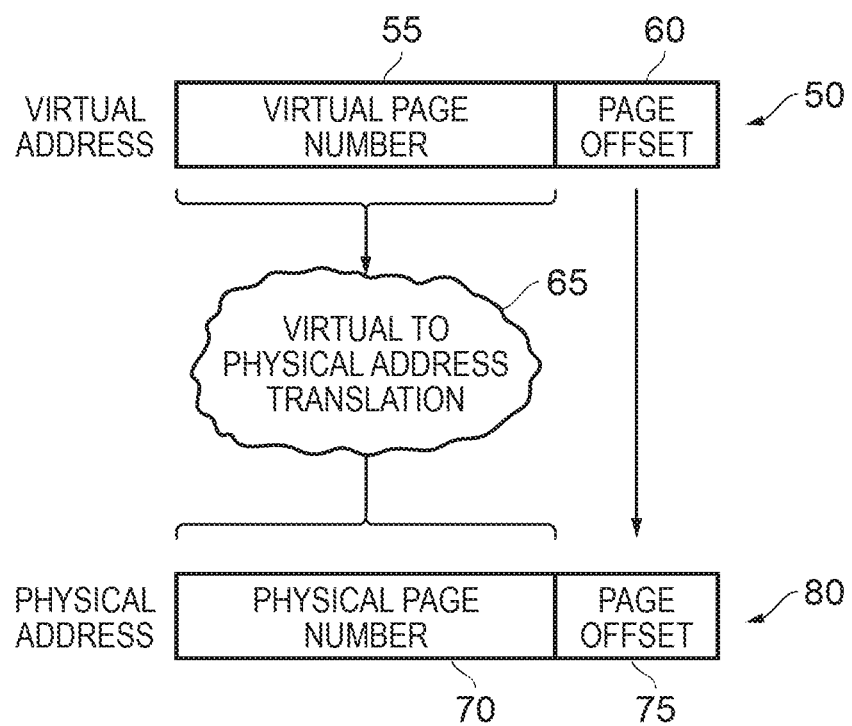
FIG. 2 is a diagram schematically illustrating a virtual to physical address translation process.

FIG. 2 is a diagram schematically illustrating the address translation process. A virtual address 50 can be considered to comprise a number of bits 55 identifying a virtual page number, and some other bits 60 identifying a page offset. The number of bits forming the virtual page number and the number of bits forming the page offset will depend on the page size. The address translation operation performed by the address translation circuitry 20 is illustrated schematically by the element 65 shown in FIG. 2, and serves to obtain address translation information sufficient to enable the virtual page number bits 55 to be translated into equivalent bits 70 of a physical address 80 identifying a physical page number. The page offset bits are not altered, and accordingly the page offset bits 75 are directly determined from the page offset bit 60 in the virtual address.

Figure 3:
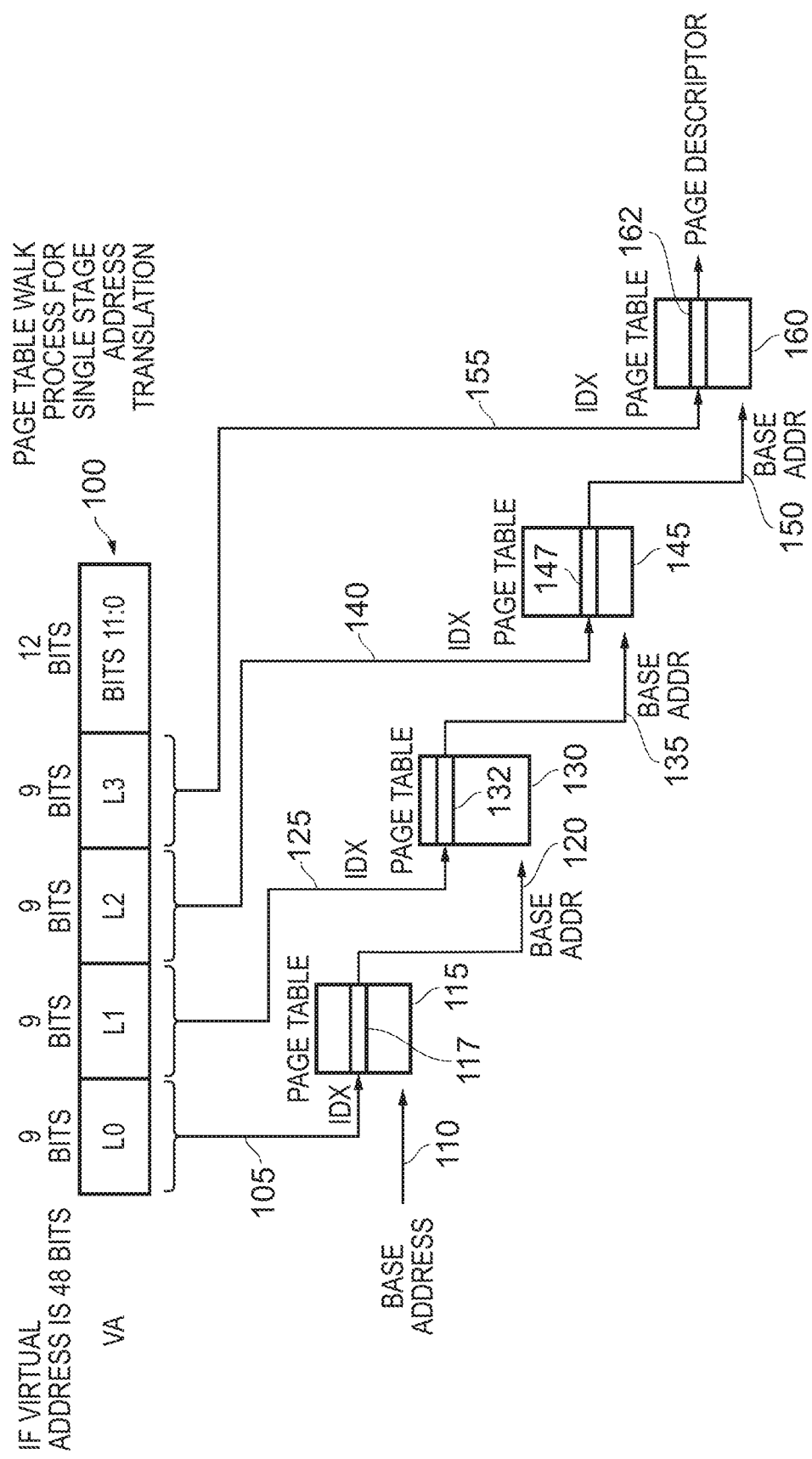
FIG. 3 schematically illustrates a multi-level page table walk which includes a single stage address translation process.

FIG. 3 is a diagram schematically illustrating the page table walk operation assuming there is a single stage address translation mechanism being used. In this example, it is assumed that the virtual address is 48 bits, and hence the virtual address 100 has a series of 9 bit portions associated with different levels of the page table walk process, with the 12 least significant bits denoting page offset.

At the start of the page table walk process, a base register is accessed to identify a base address 110 that is used to identify the page table 115. The 9 bits 105 associated with level zero of the page table walk process are used to identify an index into that page table 115, and hence identify an intermediate level descriptor 117. This intermediate level descriptor 117 provides a base address 120 that is used to identify a further page table 130, with the level one virtual address bits 125 being used to identify an index into that table. This identifies the intermediate level descriptor 132 that provides a further base address 135 to identify the page table 145. The level 2 virtual address bits 140 are then used to provide an index into that table 145 in order to identify the intermediate level descriptor 147, which then provides the base address 150 that identifies a final page table 160. The level 3 virtual address bits 155 then provide an index into that table 160, identifying a final level descriptor 162 also referred to as a page descriptor or leaf descriptor. With the information provided by the page descriptor, it is then possible to generate address translation data for storing in one of the entries of the TLB 30 enabling the virtual page number 55 to be converted into a physical page number 70 and hence allowing the required page in memory to be identified. This then enables the particular item of data (or instruction) corresponding to the virtual address to be accessed by the core 10 issuing the required physical address to the memory system 15.

It should be noted that in some embodiments final level descriptors can be specified at an earlier level in the page table walk process. For example, the descriptor 147 can have a block field which, when set, indicates that that descriptor is a block descriptor, which is a type of final level descriptor, rather than being an intermediate level descriptor. Hence, the information within the descriptor 147 can be used to produce the full address translation data.

It will hence be appreciated that the address translation information returned to the address translation circuitry 20 to enable address translation data to be allocated into the address translation cache can relate to various different page sizes. For example, if the final level descriptor is the descriptor 162, i.e. is a leaf descriptor, then the received translation information may relate for example to a 4 KB sized page. Conversely, if the final level descriptor is a block descriptor then the associated page size is likely to be significantly larger. For example, if the descriptor 147 in FIG. 3 is such a block descriptor, then it may in one embodiment relate to a 2 MB page size. Additionally, other techniques may be employed that allow address translation data of a different size to be generated from the received translation information. For example, it is known in some systems to create coalesced TLB entries in the specific situation where multiple descriptors meet page alignment criteria and have the same attribute data. Considering a situation where a leaf descriptor relates to a 4 KB page, this may for example mean that address translation data for a coalesced 16 KB page may be created from multiple of such descriptors, for storage within the address translation cache. Use of software contiguous hint (CH) techniques may also allow groups of pages to be saved as a larger page within the address translation cache, such a technique hence providing a software controlled coalescing mechanism. This could for example allow address translation data to be generated for a 64 KB page size from multiple final level descriptors.

In order to increase the effective capacity of the address translation cache 30, it is useful to allow the address translation cache to hold address translation data for more than one page size. However, this can complicate the lookup process used to determine whether the address translation cache holds address translation data for a specified virtual address, and hence can impact performance. In particular, when the address translation cache is arranged as a set associative cache, the set in which a lookup needs to be performed is likely to be dependent on the page size, since different index bits will be selected from the virtual address dependent upon an assumed page size. This can mean that a number of sequential lookups need to be performed before it can be determined whether there is a hit or a miss within such a set associative address translation cache.

As will be discussed in more detail with reference to the following embodiments, in one embodiment the control circuitry 25 includes mode control circuitry that can dynamically switch a mode of operation of the address translation circuitry 20 between a non-skewed mode and at least one skewed mode dependent on a page size analysis operation. In the non-skewed mode, when allocating an entry of the address translation cache to store address translation data, the allocation circuitry (which in one embodiment can be considered to be part of the control circuitry 25) is arranged to permit the address translation data to be allocated into any of the ways of the set associative address translation cache (as mentioned earlier, the set will typically be determined using selected index bits of the virtual address, where those selected index bits are dependent on the page size associated with the address translation data).

However, in one embodiment, in order to seek to ensure fast lookup times, the allocation circuitry may be arranged to produce address translation data for a fixed page size (for example 4 KB) irrespective of the page size associated with the received translation information returned from the page table walk operations. In particular, for situations where the page size associated with the received translation information is larger than that fixed page size, the allocation circuitry may perform a fracturing operation to produce the address translation data for the fixed page size. Hence, in the non-skewed mode, address translation data can be allocated within any of the ways, but may be constrained to be of a fixed size, so that a single lookup can be performed, hence ensuring fast processing of the lookup operation.

However, if based on the page size analysis operation, the mode control circuitry determines that the mode should transition to a skewed mode, then the allocation circuitry is arranged, when performing the allocation process, to reserve at least one way for allocation of address translation data associated with pages of a first page size, and at least one other way for allocation of address translation data associated with pages of a second size larger than the first page size. Hence, considering the earlier-mentioned example where coalescing is supported, and hence address translation data for 16 KB page sizes may be generated in some instances, rather than address translation data of 4 KB associated with a leaf descriptor, when in the skewed mode the allocation circuitry may reserve one way for storage of such coalesced address translation data, whilst all of the remaining ways are then reserved for storing address translation data associated with 4 KB pages.

By constraining the use of the ways in such a manner, it is still possible to ensure a quick lookup operation can be performed, even though the address translation cache 30 is allowed to store address translation data for multiple different page sizes. In particular, a lookup can be performed in parallel within the way reserved for storage of the larger page size, whilst also performing a lookup within the other ways for address translation data associated with pages of the smaller page size.

This technique can be extended so as to provide more than one skewed mode. For example, one or more further skewed modes may be provided where a way is reserved for address translation data relating to a third page size, another way is reserved for address translation data relating to a second page size, and all of the remaining ways are reserved for address translation data associated with the first page size.

Hence, when the address translation circuitry is placed within one of the skewed modes of operation, the effective capacity of the address translation cache 30 is increased by allowing address translation data associated with larger pages sizes to be stored within the address translation cache, but this done without impacting performance of the lookup operation, by constraining how the ways are used to store the address translation data of each page size.

Figure 4:
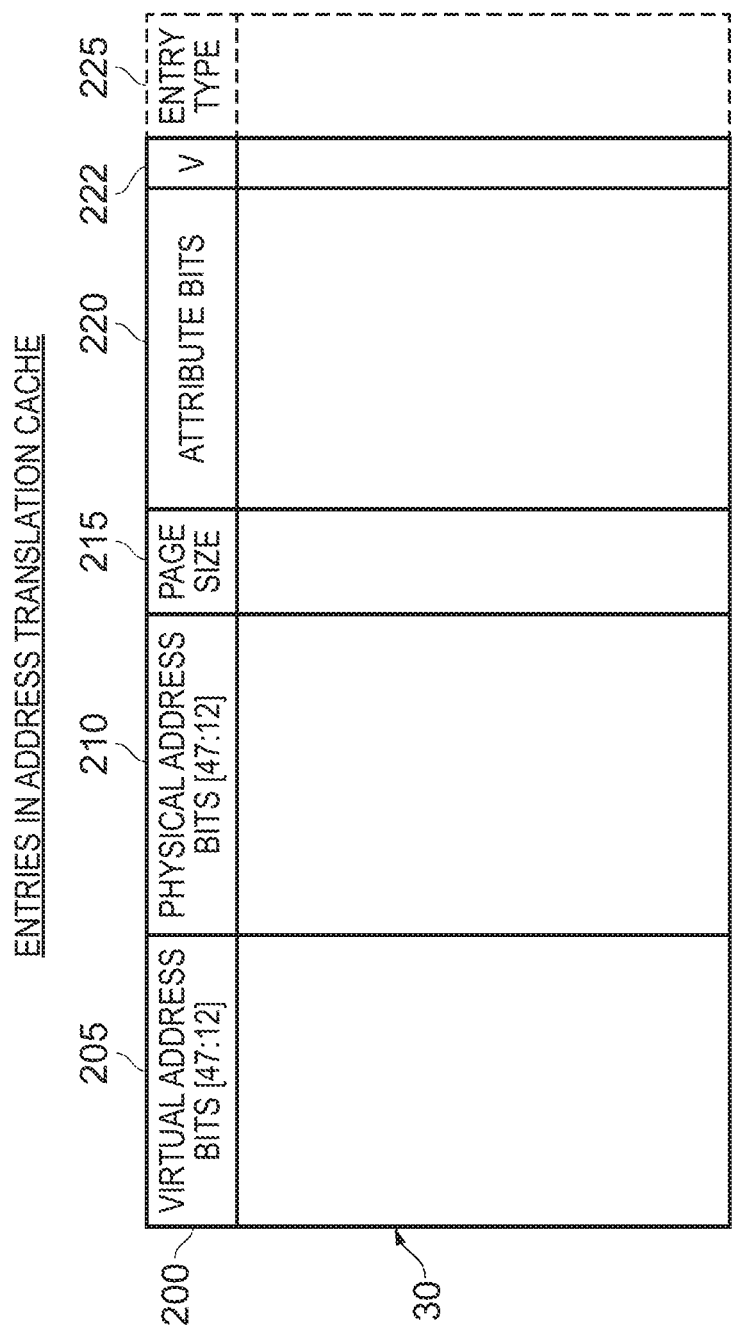
FIG. 4 schematically illustrates the contents of each entry within the address translation cache in accordance with one embodiment.

FIG. 4 is a diagram schematically illustrating the fields that may be provided within each entry of the address translation cache 30 in accordance with one embodiment. As shown, an entry 200 may include a virtual address portion 205 containing a certain number of the virtual address bits. The number of bits stored in this field will be dependent on embodiment, but assuming the earlier example of FIG. 3 where the most significant 36 bits of a 48-bit virtual address are used during the multi-level page table walk process, bits 47 to 12 may be stored within the virtual address field 205. A corresponding physical address field 210 is used to store corresponding physical address bits. When the entry is storing full address translation data, these physical address bits will represent the corresponding physical page number used when translating the virtual address to a physical address. In one embodiment, the address translation cache may be used solely for storing such full address translation data. However, in an alternative embodiment, it may be possible for the address translation cache to additionally store partial address translation data. When an entry stores partial address translation data, the physical address bits in the field 210 will be used to identify a partial translation, for example identifying a base address of the next page table within the page table walk process. Hence, when a hit is detected with regards to partial address translation data, this can enable part of the page table walk process to be avoided, and instead merely the remaining parts of the page table walk process need to be completed in order to identify the full address translation data.

In one embodiment, a page size field 215 is provided to indicate a page size of a page within the memory system that is associated with the address translation data stored in that entry. The field 220 is used to store other attribute data associated with the address translation data. These attributes can take a variety of forms, and may for example include access permissions, and memory type information, such as whether the associated page relates to a writeback region of memory, a non-cacheable region, etc. A further field 222 is used to store a valid bit to identify if the entry stores valid information.

If desired, an optional field 225 may be provided to indicate an entry type of the address translation data stored within the corresponding entry. For example, the information in this field could be used to identify situations where the address translation data is coalesced address translation data formed from a plurality of adjacent descriptors. In embodiments where the address translation cache not only stores full address translation data, but can also store partial address translation data, the entry type can be used to identify whether the entry relates to full address translation data or partial address translation data.

In another embodiment, the page size information could be encoded as part of the "type" information, such that the page size field 215 and type field 225 are logically combined into a single field that conveys both type and size, thereby potentially reducing the amount of storage required for the combination of the type and size fields.

Figure 5:
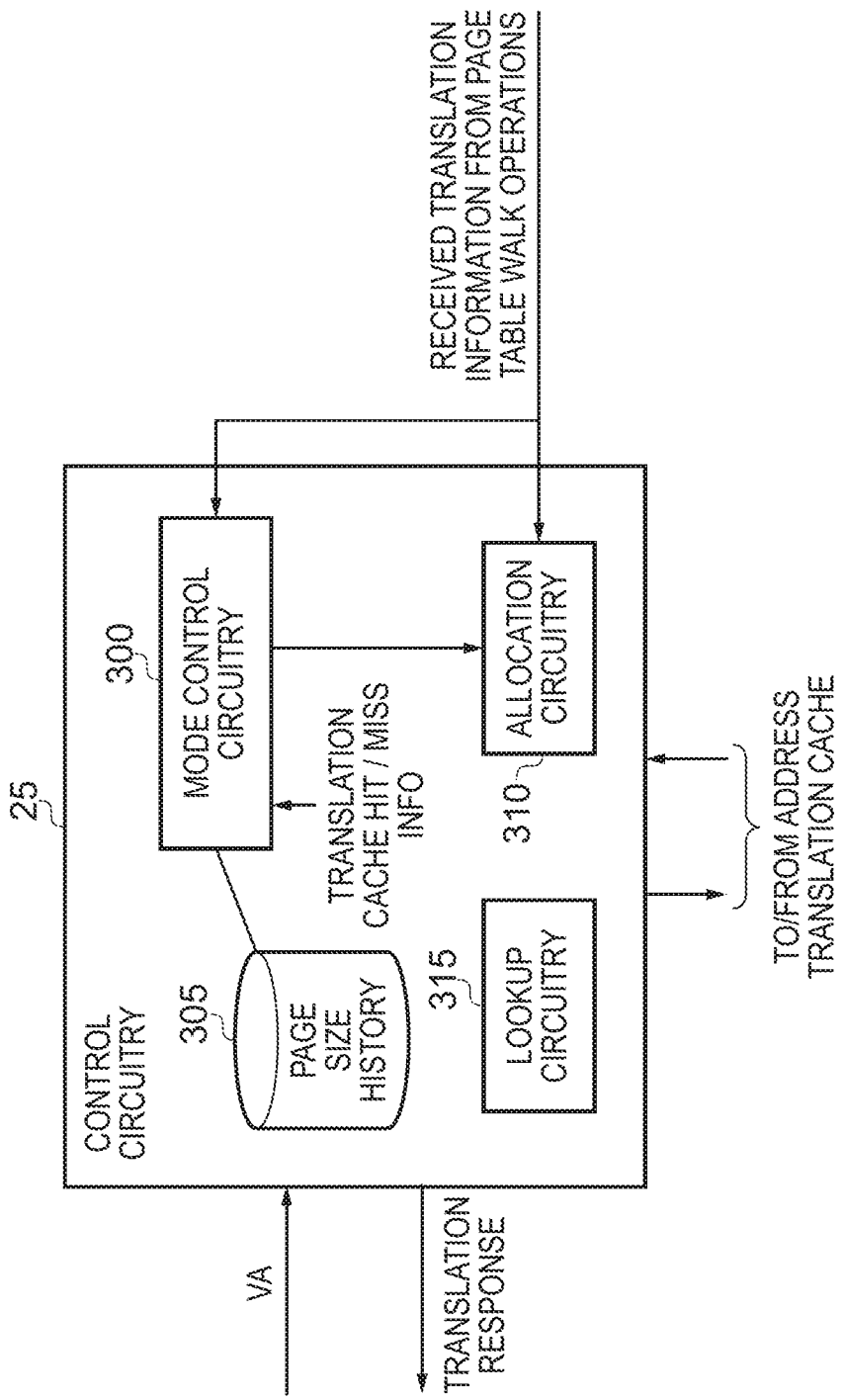
FIG. 5 is a block diagram illustrating components provided within the control circuitry of FIG. 1 in accordance with one embodiment.

FIG. 5 is a block diagram illustrating components provided within the control circuitry 25 of FIG. 1 in accordance with one embodiment. Allocation circuitry 310 is provided to allocate address translation data into entries of the address translation cache 30 based on received translation information provided as a result of the page table walk operations performed with regard to the page tables 35 in memory. The operation of the allocation circuitry 310 is dependent on a control signal from the mode control circuitry 300, and in particular will depend on whether the mode control circuitry places the address translation circuitry 20 into a non-skewed mode of operation, or a skewed mode of operation. As per the earlier discussion, in one embodiment, when in the non-skewed mode, the allocation circuitry 310 will generate address translation data for storing in the allocated entry of the address translation cache so that that address translation data is associated with a fixed page size, independent of the page size associated with the received translation information.

However, if the mode control circuitry places the address translation circuitry 20 into a skewed mode of operation, one or more ways may be reserved for address translation data associated with larger page sizes. Accordingly, based on the received translation information, the allocation circuitry 310 may decide to generate address translation data of a larger page size, and store that within one of the reserved ways for the larger page sizes, or to perform a fracturing operation in order to generate address translation data for a smaller page size to be stored within one of the other ways. For example, if in the skewed mode of operation a way is reserved for storing address translation information associated with a 16 KB page, then if the received translation information represents information for a coalesced page of 16 KB, the allocation circuitry can determine that address translation data for a 16 KB page should be generated and stored within the reserved way. However, if for the set identified by the relevant bits of the virtual address, a valid entry already exists within the reserved way for a 16 KB page size, then dependent on the replacement policy, the allocation circuitry may in fact decide not to generate address translation data for the 16 KB page size, but instead to generate address translation data for a 4 KB page size, and to store that address translation data within one of the other ways of a set identified using the relevant index bits for a 4 KB page size.

In one embodiment, for any received translation information relating to the smallest page size, which in one embodiment is assumed to be the 4 KB page size, then the allocation circuitry will generate address translation data for that 4 KB page size, and store it within one of the ways that has not been reserved for larger page sizes.

Lookup circuitry 315 is used to perform lookup operations within the address translation cache based on received virtual addresses. The lookup operation performed will depend upon whether the address translation circuitry 20 is currently operating in the non-skewed mode or a skewed mode. In the non-skewed mode, it is assumed in one embodiment that the allocation circuitry 310 will always generate address translation data for the smallest page size (e.g. the 4 KB page size), but then allow that address translation information to be stored within any of the ways. Hence, when a virtual address is received and the address translation circuitry is operating in the non-skewed mode, the relevant index bits from the virtual address that are appropriate for a 4 KB page size are used to identify a set, and then a single lookup is performed within all the ways of that set to determine whether there is a hit. A hit may be detected for an entry if the valid bit of that entry is set, the page size information matches, and the bits of the virtual address compared with corresponding virtual address bits in the field 205 match. In the absence of a hit, a page table walk process can then be initiated in order to obtain the required address translation information.

If instead the address translation circuitry is operating in the skewed mode, then a lookup can be performed in parallel for each of the page sizes supported by the skewed mode. For example, if one way is reserved for address translation data associated with 16 KB pages, and the remaining ways are reserved for address translation data associated with 4 KB pages, then the relevant index bits for a 4 KB page can be used to identify one set, with the lookup being performed in the relevant ways of that set, whilst a different selection of index bits relevant for a 16 KB page size can be used to identify another set, with a lookup being performed in parallel for the way of that set that is reserved for 16 KB pages. Accordingly, even though in the skewed mode the address translation cache can store address translation data for multiple different page sizes, the lookup process can still be performed quickly and efficiently in order to determine whether there is a hit or not within the address translation cache.

Irrespective of whether the non-skewed mode or the skewed mode is used, in the event of a hit, the translation response can be generated directly using the contents of the hit entry. In the event of a miss, a page table walk operation will be performed in order to obtain the required translation information, then enabling a translation response to be returned to the core 10. In one embodiment, the allocation circuitry 310 will also allocate an entry within the address translation cache based on the returned translation information from the page table walk process.

The mode control circuitry 300 applies a page size analysis operation in order to determine into which mode to place the address translation circuitry 20 at any point in time. In one embodiment, the mode control circuitry 300 maintains a page size history 305 based on multiple instances of received translation information from page table walk processes. This page size history may relate to a predetermined sliding window of time, or alternatively may capture the information for a certain predetermined number of previously received items of translation information. In particular, the page sizes associated with each item of received translation information within the history period is retained, with the mode control circuitry referencing that information in order to determine whether it is appropriate for the apparatus to be operating in the non-skewed mode or within a skewed mode.

For example, if most of the pages being accessed are of the smallest page size, it may be appropriate for the mode control circuitry to operate in the non-skewed mode, since this may represent the most efficient use of the address translation cache. In particular, it may not be appropriate to reserve one or more ways for larger page sizes when use of such page sizes is relatively infrequent. However, if the proportion of page sizes greater than the smallest page size is relatively high, this may be used to indicate that a switch should be made to a skewed mode of operation. In one embodiment, the mode control circuitry may use a heuristic algorithm to determine when to switch between the non-skewed and skewed modes. Further, in embodiments when more than one skewed mode is provided, a more detailed analysis of the page size history could be performed in order to determine not only when to switch to a skewed mode, but also which skewed mode to switch to. For example, when both 16 KB and 64 KB pages sizes are quite frequently used in relation to the translation information returned from the page table walk operation, it may be appropriate to provide a skewed mode where at least one way is reserved for 16 KB page size address translation data, another way is reserved for 64 KB address translation data, and the remaining ways are then used for 4 KB address translation data. Conversely, if it is only 16 KB page sizes that are relatively frequently used out of the supported larger page sizes, then a skewed mode where one or more ways are reserved for 16 KB address translation data, with all of the remaining ways reserved for 4 KB address translation data, may be more preferable.

In one embodiment, in addition to maintaining the page size history 305 based on the received translation information, the mode control circuitry 300 can also keep track of the translation cache hit/miss information for a number of previous lookups. In particular, in one embodiment, this can be used when determining whether to switch from a skewed mode back to the non-skewed mode. For example, whilst the page size history 305 may indicate that occurrences of the larger page sizes has dropped below a threshold level, if the hit/miss information from the translation cache indicates that hits are still being detected relatively frequently for address translation data relating to one of the larger page sizes, this may cause the mode control circuitry to remain within the skewed mode of operation for the time being.

Figure 6:
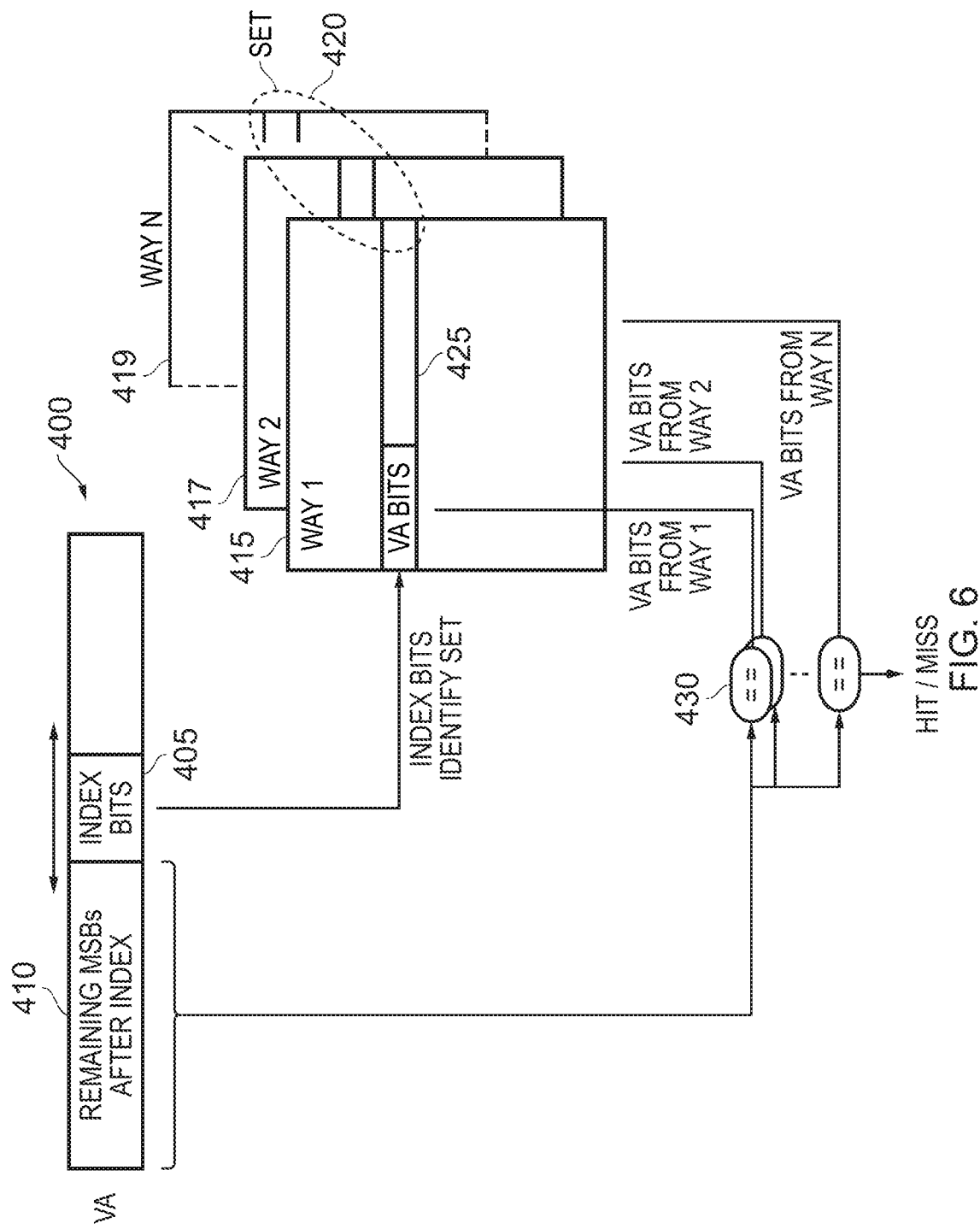
FIG. 6 is a diagram schematically illustrating how a virtual address is used to access entries within a set associative address translation cache in accordance with one embodiment.

FIG. 6 is a diagram schematically illustrating how a virtual address is used to access entries within a set associative address translation cache in accordance with one embodiment. In particular, a certain number of index bits 405 within the virtual address 400 will be identified based on an assumption about page size, and those bits will be used as an index into the various ways 415, 417, 419 of the set associative structure in order to identify a set 420 containing one entry in each way. The contents of those entries within the set may then be routed to comparison circuitry 430 where the remaining most significant bits 410 of the virtual address (i.e. the bits more significant than the index bits) will be compared with corresponding bits in the virtual address field of each entry 425 in order to detect whether a hit is present. As mentioned earlier, only entries marked as valid will be considered, and other criteria may also need to be met for a hit to be detected (e.g. page size match).

Figure 7:
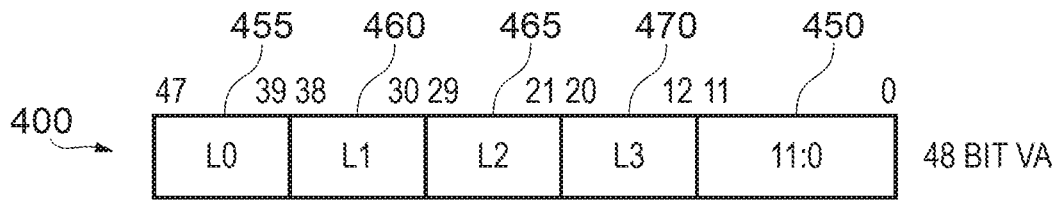
FIG. 7 illustrates how various portions of the virtual address may be used in one embodiment to identify the index bits and the compare bits used in the process illustrated in FIG. 6, dependent on the page size.

How the page size influences the index bits 405 selected from the virtual address is illustrated schematically in FIG. 7 for the example of a 48-bit virtual address 400 containing the portions 450, 455, 460, 465, 470. The two tables shown in FIG. 7 for embodiments 1 and 2 assume an address translation cache with 512 sets. Considering first embodiment 1, then assuming a 4 KB page size, bits 20 to 12 (i.e. those associated with the level 3 page table walk process) are chosen as the index bits, with bits 47 to 21 then forming the compare bits. In this example, it is assumed that an entry whose page size indicates 4 KB will relate to full address translation data of the leaf type discussed earlier.

However, as mentioned earlier, full address translation data may also be determined from block descriptors, in which case the effective page size is larger. For example, an entry may contain full address translation data associated with a block descriptor identified at level 2 of the page table walk process. The page size for such an entry may be 2 MB, and in that instance bits 29 to 21 are used as the index bits, and bits 47 to 30 are used as the compare bits. Similarly, for full address translation data associated with a block descriptor at the level 1 page table walk process, a 1 GB page may be used, and in that instance the index bits are formed by bits 38 to 30, with bits 47 to 39 being used as the compare bits.

It will be appreciated that block descriptors do not need to be provided at multiple levels, and indeed in some embodiments no such block descriptors may be used. However, as shown in embodiment 2, even where block descriptors are not used, it is still possible to have full address translation data of different page sizes, if the earlier-described coalescing techniques or software contiguous hint (CH) techniques are used. Hence, the leaf descriptors may still relate to 4 KB page sizes, with the index bits and compare bits being as discussed earlier for embodiment 1. However, a coalesced entry may be generated to form address translation data associated with a 16 KB page, in which event bits 22 to 14 will be used as the index bits, with bits 47 to 23 used as the compare bits.

Optionally, 64 KB pages sizes may also be associated with address translation data, for example where contiguous hint bits are set causing a software managed coalescing of address translation information to take place. In that embodiment, bits 24 to 16 may be used as the index bits, with bits 47 to 25 used as the compare bits.

Figure 8:
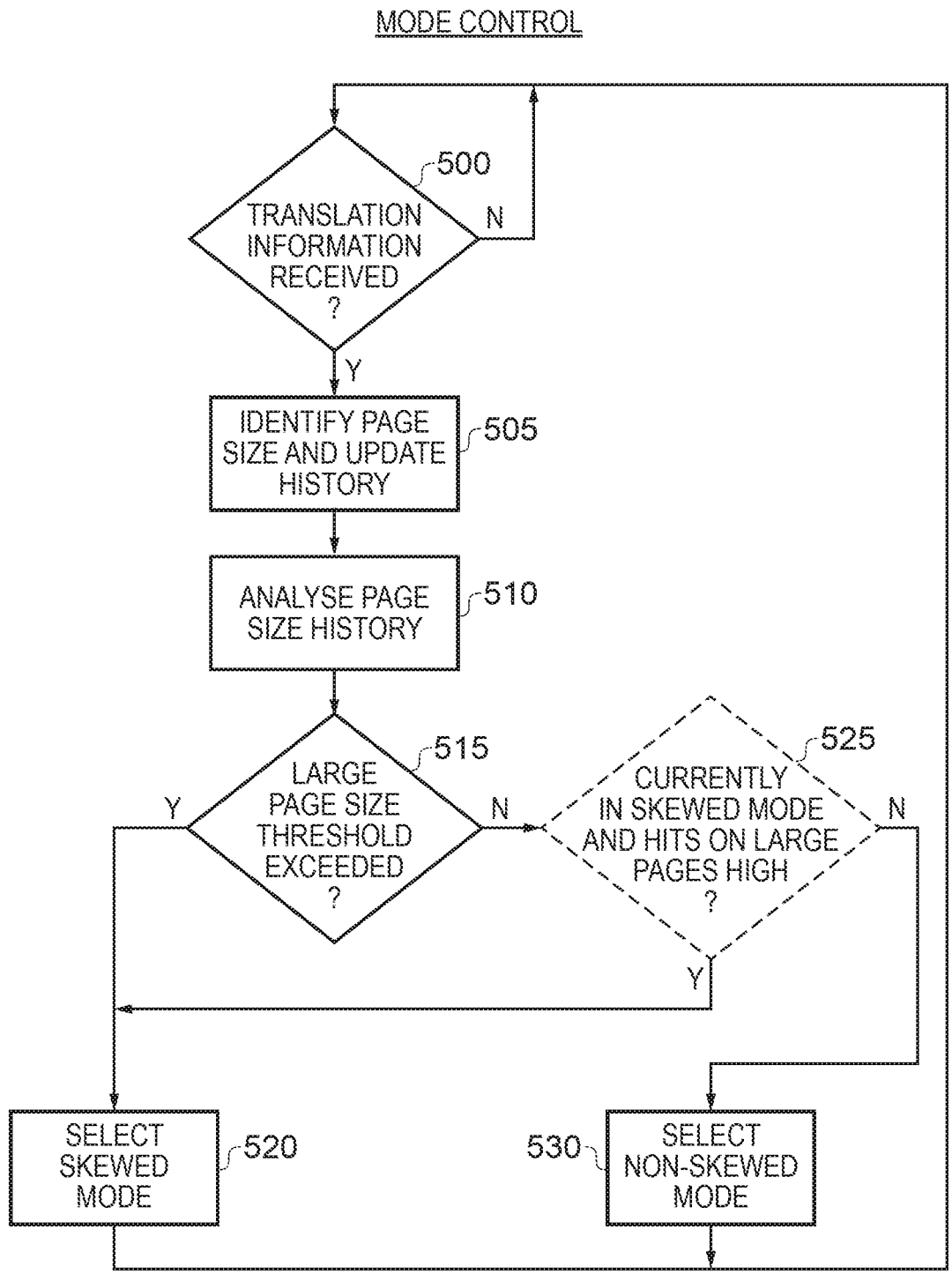
FIG. 8 is a flow diagram illustrating the operation of the mode control circuitry of FIG. 5 in accordance with one embodiment.

FIG. 8 is a flow diagram illustrating operation of the mode control circuitry of FIG. 5 in accordance with one embodiment. At step 500, it is determined whether a new item of translation information has been received from the memory system. As each item of translation information is received, the mode control circuitry identifies the associated page size, and updates the page size history within the storage 305. At step 510, the page size history is then analysed in order to determine whether it indicates that the skewed mode should be used or the non-skewed mode should be used. As mentioned earlier, in one embodiment a heuristic algorithm can be used for this process, with some threshold being specified, such that when that large page size threshold is exceeded, this indicates that the skewed mode should be used. Accordingly, as indicated by the decision box 515, if it is determined that the large page size threshold has exceeded, then a skewed mode will be selected at step 520. As mentioned earlier, in embodiments where more than one skewed mode is provided, a more detailed analysis of the page size history may be performed in order to determine exactly which skewed mode is to be selected at step 520.

If the large page size threshold is not exceeded, then in one embodiment at step 530 the non-skewed mode is selected. However, in one optional embodiment, rather than the no path from box 515 proceeding directly to selecting the non-skewed mode, an additional criteria may be evaluated as indicated by the decision box 525. In particular, if the address translation circuitry is currently being operated in the skewed mode, and translation cache hit/miss information also received by the mode control circuitry indicates that there are still a significant number of hits taking place with regard to the larger page(s), then it may decide to remain within the skewed mode, as a result of which the path branches to step 520. However, if this is not the case, then the process proceeds to step 530, where the non-skewed mode is selected.

Figure 9:
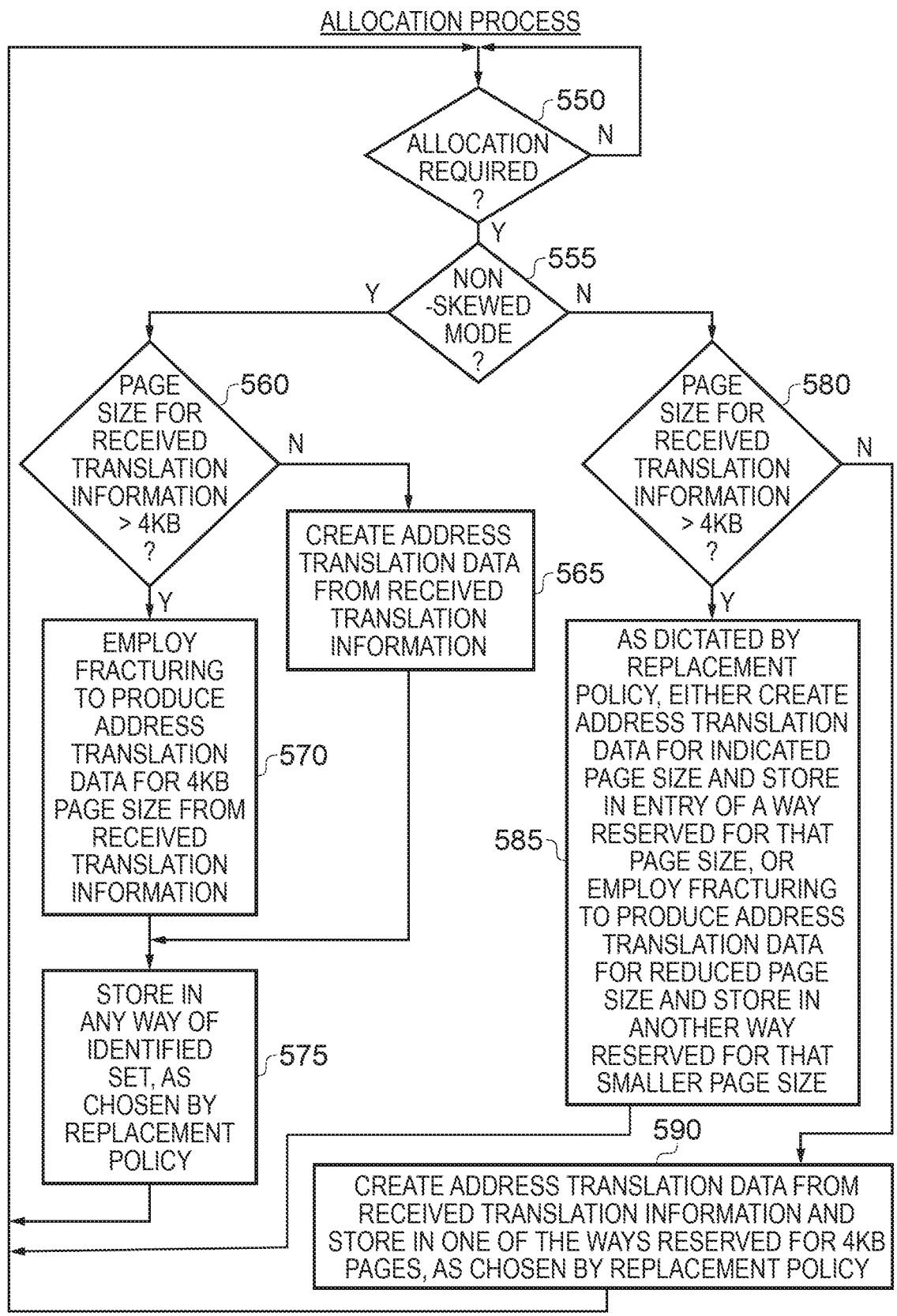
FIG. 9 is a flow diagram illustrating the allocation process performed by the allocation circuitry of FIG. 5 in accordance with one embodiment.

FIG. 9 schematically illustrates the allocation process performed by the allocation circuitry 310 of FIG. 5 in accordance with one embodiment. At step 550 it is determined whether an entry is to be allocated within the address translation cache. If it is, then at step 555 it is determined whether the apparatus is currently operating in the non-skewed mode. If it is, then in one embodiment it is determined at step 560 whether the page size for the received translation information (i.e. the translation information that is to be used to formulate the address translation data to be stored within the allocated entry) relates to a page size that is greater than 4 KB (in this embodiment it being assumed that the smallest supported page size is 4 KB). Assuming the page size associated with the received translation information is not greater than 4 KB, then at step 565 the address translation data is merely created directly from the received translation information. However, otherwise, at step 570 a fracturing process is employed to produce address translation data for a 4 KB page size from the received translation information. In one embodiment, the generated address translation data will relate to a 4 KB page size that will produce a hit for the virtual address of interest. In particular, it is typically the case that the received translation information will have resulted from a page table walk process that itself resulted from a miss being detected in the address translation cache for a virtual address received from the core. At the time of performing the fracturing operation, consideration will be given as to the 4 KB range that will include the virtual address of interest, when performing the fracturing operation to produce the address translation data.

Irrespective of whether the process proceeds via steps 565 or 570, at step 575 the resultant address translation data can then be stored in any way of the identified set, as chosen by the replacement policy. In particular, the relevant index bits will be used to identify the appropriate set, and then the replacement policy is applied to identify which entry within that set is to be used as the allocated entry. For example the replacement policy may employ any standard scheme, such as least recently used (LRU), in order to identify the victim entry to be used to allocate the new address translation data into, assuming all of the entries for the set are valid. If instead at least one entry is invalid, then one of the invalid entries will be used as the allocated entry.

If at step 555 it is determined that the apparatus is operating in a skewed mode, then at step 580 it is determined whether the page size for the received translation information is greater than 4 KB. If not, then the address translation data is created at step 590 from the received translation information and is stored in one of the ways reserved for 4 KB pages, as chosen by the replacement policy.

However, if the page size of the received translation information is greater than 4 KB, then at step 585 the allocation circuitry may create address translation data for the indicated page size, assuming that indicated page size is one of the page sizes supported in the skewed mode, and then store that address translation data in an entry of a way reserved for that page size. However, it may be that, having regard to the set identified using that page size, the entry or entries that could be allocated already contain valid data for that page size. In such situations, based on the replacement policy, it may be decided to overwrite one of those existing entries with the new address translation data, or instead it may be determined that it is appropriate to retain that information already within the address translation cache, in which event fracturing can be employed to produce address translation data for a reduced page size, with that generated address translation data then being stored in another way reserved for that smaller page size.

Hence, by way of example, if the skewed mode reserves one way for storage of address translation data associated with 16 KB pages, with all of the other ways being used for 4 KB address translation data, then when the received translation information relates to a 16 KB page size, application of the replacement policy may cause the new address translation data to either be generated for a 16 KB page size, and with that address translation data then overwriting another valid 16 KB entry within a reserved way of the address translation cache, or instead it may be decided to retain that valid entry as is, and instead to perform a fracturing operation in order to generate address translation data for a 4 KB page size, with that address translation data then being stored in one of the other ways, again as dictated by the replacement policy.

It will also be appreciated that in the above specific example of the skewed mode, if the received translation information relates to a 64 KB page, then fracturing will in any case be required in order to generate address translation data that can be stored within the address translation cache. Dependent on the replacement policy, the fracturing operation may produce a 16 KB page size to be stored within a way reserved for that page size, or alternatively the fracturing operation may produce address translation data for a 4 KB page size, to be stored in one of the other ways.

Figure 10:
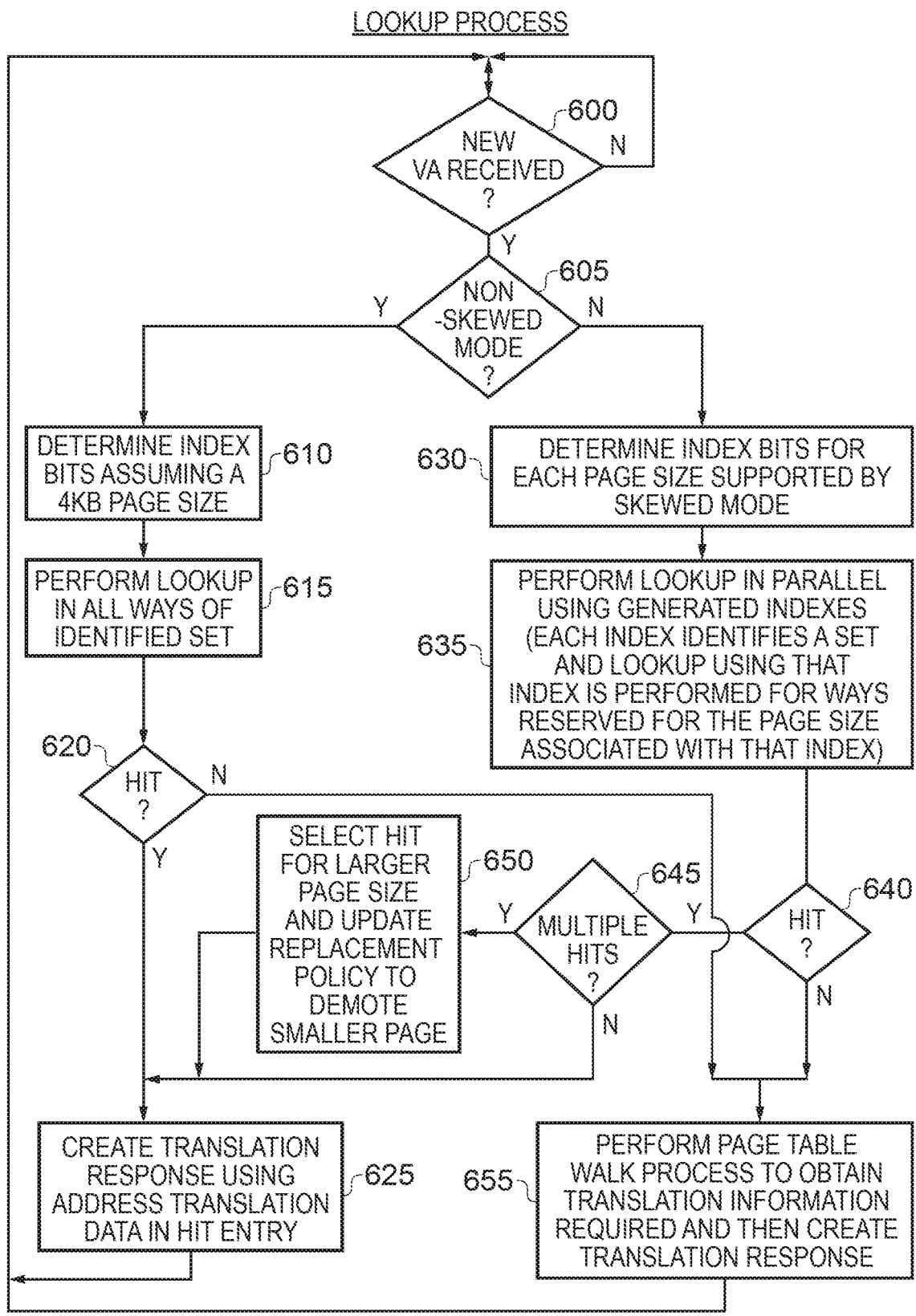
FIG. 10 is a flow diagram illustrating the lookup process performed by the lookup circuitry of FIG. 5 in accordance with one embodiment.

FIG. 10 is a flow diagram illustrating the lookup process performed by the lookup circuitry 315 of FIG. 5 in accordance with one embodiment. At step 600, it is determined whether a new virtual address has been received from the core 10, and upon receipt of such a virtual address, it is then determined at step 605 whether the apparatus is currently operating in the non-skewed mode. If so, then at step 610 the index bits are determined from the virtual address assuming a 4 KB page size. At step 615, a lookup is then performed in all ways of the identified set in order to determine whether a hit is detected. If a hit is detected at step 620, then the translation response returned to the core 10 is created using the address translation data in the hit entry at step 625, with the process then returning to step 600. In the event of a miss, then the process proceeds to step 655, where a page table walk process is performed to obtain the translation information required, and then the translation response is created from that translation information. As discussed earlier, in addition the allocation circuitry 310 may allocate an entry within the address translation cache to store address translation data derived from that received translation information.

Figure 11:
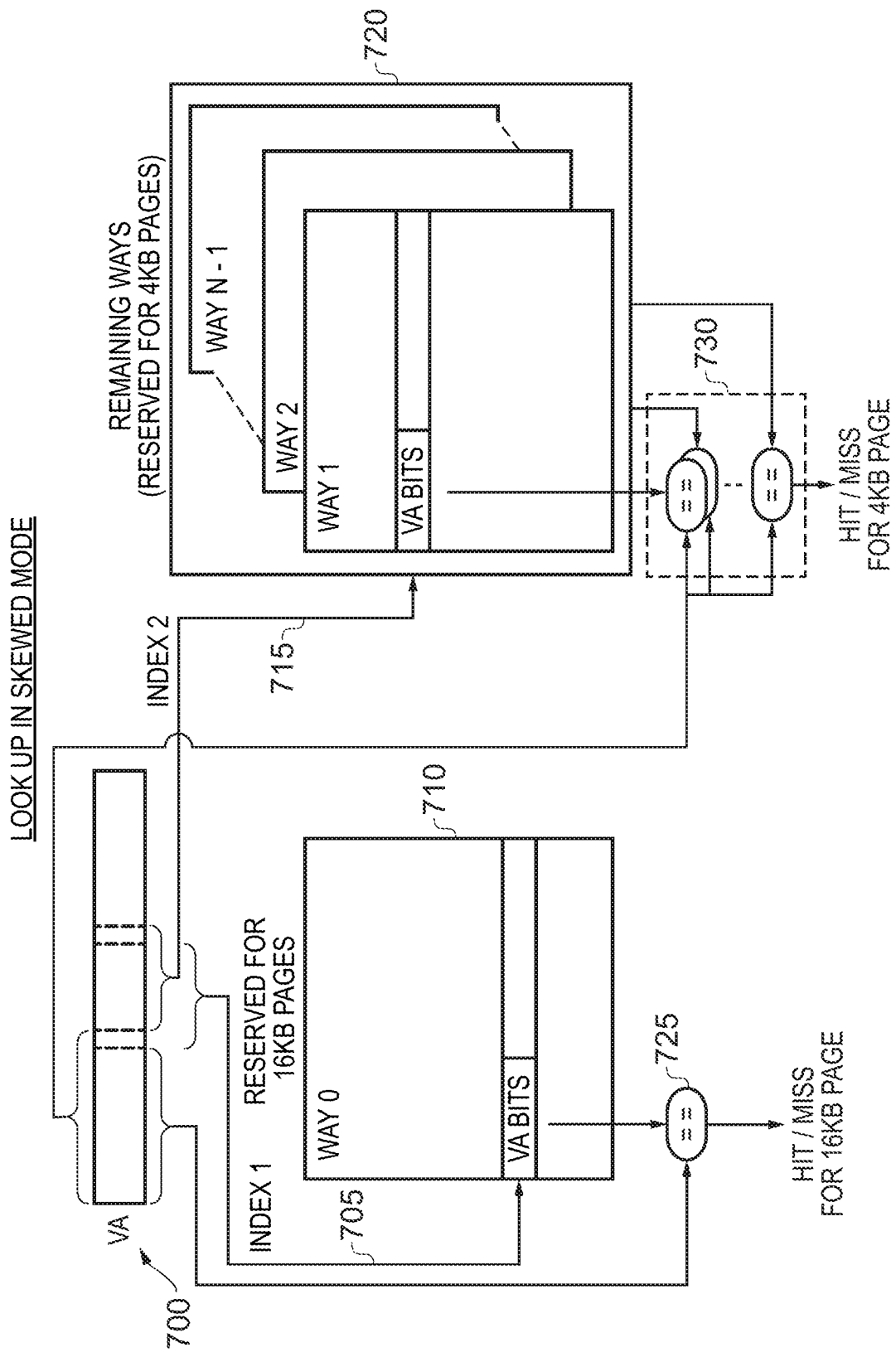
FIG. 11 illustrates how parallel lookups are performed in one embodiment when the apparatus is operating in a skewed mode of operation.

If it is determined at step 605 that the apparatus is currently operating in a skewed mode of operation, then at step 630 index bits are determined for each page size supported by the skewed mode, i.e. for each page size for which an entry may be allocated in the address translation cache. Then, at step 635, a lookup is performed in parallel using the generated indexes. In particular, each index will identify a set, and the lookup that uses that index is performed for the ways of that identified set that are reserved for the page size associated with that index. This process is illustrated schematically in FIG. 11, for the example scenario where way 0 710 is reserved for address translation data of 16 KB pages, whilst all of the remaining ways 720 are reserved for address translation data associated with 4 KB pages. As illustrated schematically for the virtual address 700, whilst the first index 705 will be used to identify a set within way 0, with the index bits being chosen having regard to the 16 KB page size, a different index 715 will be used to identify a set based on index bits chosen having regard to a 4 KB page size. The first index 705 will be used to access an entry within way 0 710, with the virtual address bits of that entry then being forwarded to the comparator 725, along with the remaining bits of the virtual address that are more significant than the index bits used for the lookup in way 0. The comparator output 725 will then indicate whether there is a hit or a miss for a 16 KB page. Similarly, using the index 715, a lookup will be performed in all of the other ways, for the set identified by that index 715, with the VA bits from each valid entry being forwarded to corresponding comparator circuits 730, which will also receive the remaining most significant bits of the virtual address 700 (i.e. the bits that are more significant than the index bits 715). Hence, the output from the comparator block 730 will identify whether there is a hit or a miss for address translation data associated with a 4 KB page.

Returning to FIG. 10, it is then determined at step 640 whether a hit has been detected. If so, it is then determined at step 645 whether there are multiple hits. In particular, it will be appreciated from FIG. 11 that in that example there could at most be two hits detected. In the absence of multiple hits, the process proceeds directly to step 625 where the translation response is created using the address translation data for the hit entry. However, in the event of multiple hits, in one embodiment, as indicated by step 650, the hit is selected for the larger page size. Hence, with regard to the example of FIG. 11, any hit from the comparator block 725 will take precedence over a hit from the comparator block 730. At step 625, the translation response will then be created using the address translation data from that hit entry.

As also indicated by box 650, in one embodiment the replacement policy can be updated to effectively demote the address translation data associated with the smaller page size that had also given rise to a hit. This will preferentially mark the entry containing that address translation data as suitable for eviction, so that in due course that information will be overwritten by newly allocated address translation data allocated by the allocation circuitry 310.

As indicated in FIG. 10, if a hit is not detected at step 640, then at step 655 the page table walk process is initiated in order to obtain the required address translation information.

Figure 12:
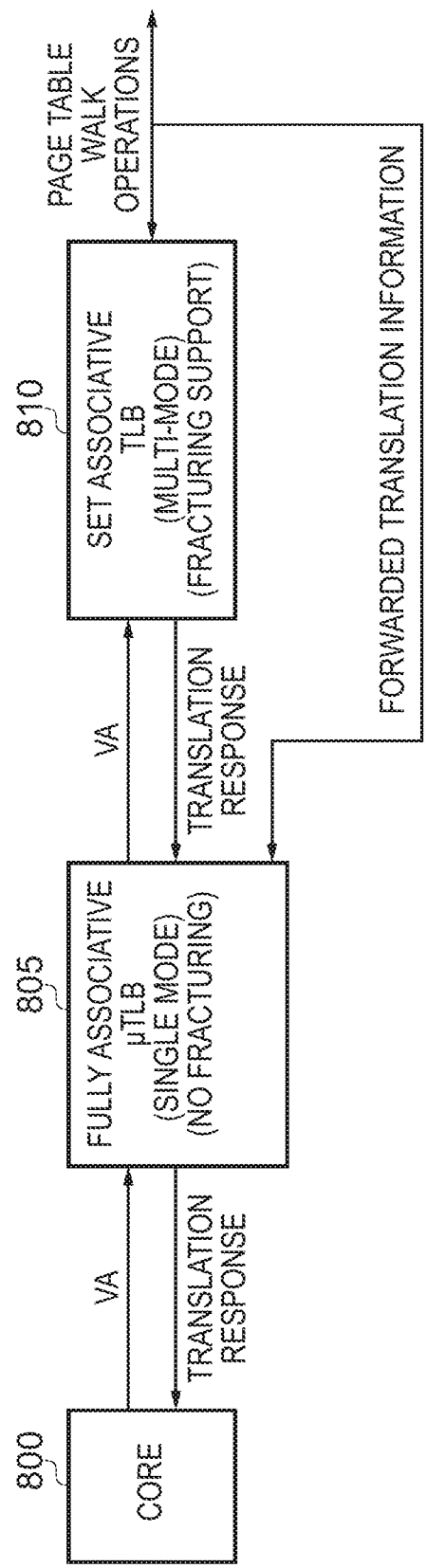
FIG. 12 illustrates an arrangement where a set associative address translation cache in accordance with the earlier-described embodiments is coupled to a processor core via a fully associative micro-TLB in accordance with one embodiment.

In one embodiment, the address translation circuitry 20 may be directly coupled to the core 10, but as illustrated in FIG. 12, in an alternative embodiment there may be an intervening structure 805. In particular, the core 800 may have access to a fully associative micro-TLB 805, with the lookup first being performed in the micro-TLB, and with the virtual address only being propagated on to the address translation circuitry 20 (in this embodiment the set associative TLB 810) in the event of a miss in the micro-TLB.

In such an embodiment, it is assumed that the set associative TLB 810 employs the mechanisms of the above-described embodiments, and accordingly can be operated in the multi-mode manner discussed earlier, with fracturing support as required. However, in the embodiment illustrated in FIG. 12, it is assumed that the fully associative micro-TLB does not use the above described techniques, and operates in a single mode. It is further assumed in this embodiment that there is no fracturing operation supported for the fully associative micro-TLB. Accordingly, when translation information (generated from a page table walk) is provided to the set associative TLB, enabling a translation response to be generated which can be forwarded via the micro-TLB to the core 800, then if an allocation operation is performed within the set associative TLB that, for the sake of argument, uses fracturing to generate address translation data for a smaller page size than the page size indicated by the translation information of the page table walk response, that page table walk response can also be forwarded to the fully associative micro-TLB over a forwarding path, where an entry can be allocated for address translation data of the page size associated with the page table walk response.

As a result, the above described techniques that can be employed in association with a set associative TLB can be adopted without any required modification to any associated micro-TLB, the micro-TLB being able to operate in its standard manner.

As mentioned earlier, in one embodiment the address translation cache is only arranged to store full address translation data, enabling the physical address associated with a specified virtual address to be determined. However, in an alternative embodiment the address translation cache may be a unified translation cache, so that in addition to the above described final level type of address translation data that identifies a full translation from the virtual address to the physical address, one or more entries may also store intermediate level types of address translation data that identify a partial translation of the virtual address. That partial translation can then be used, in combination with remaining steps of a page table walk process, in order to obtain the full address translation information required to convert a virtual address into a physical address.

Figure 13:
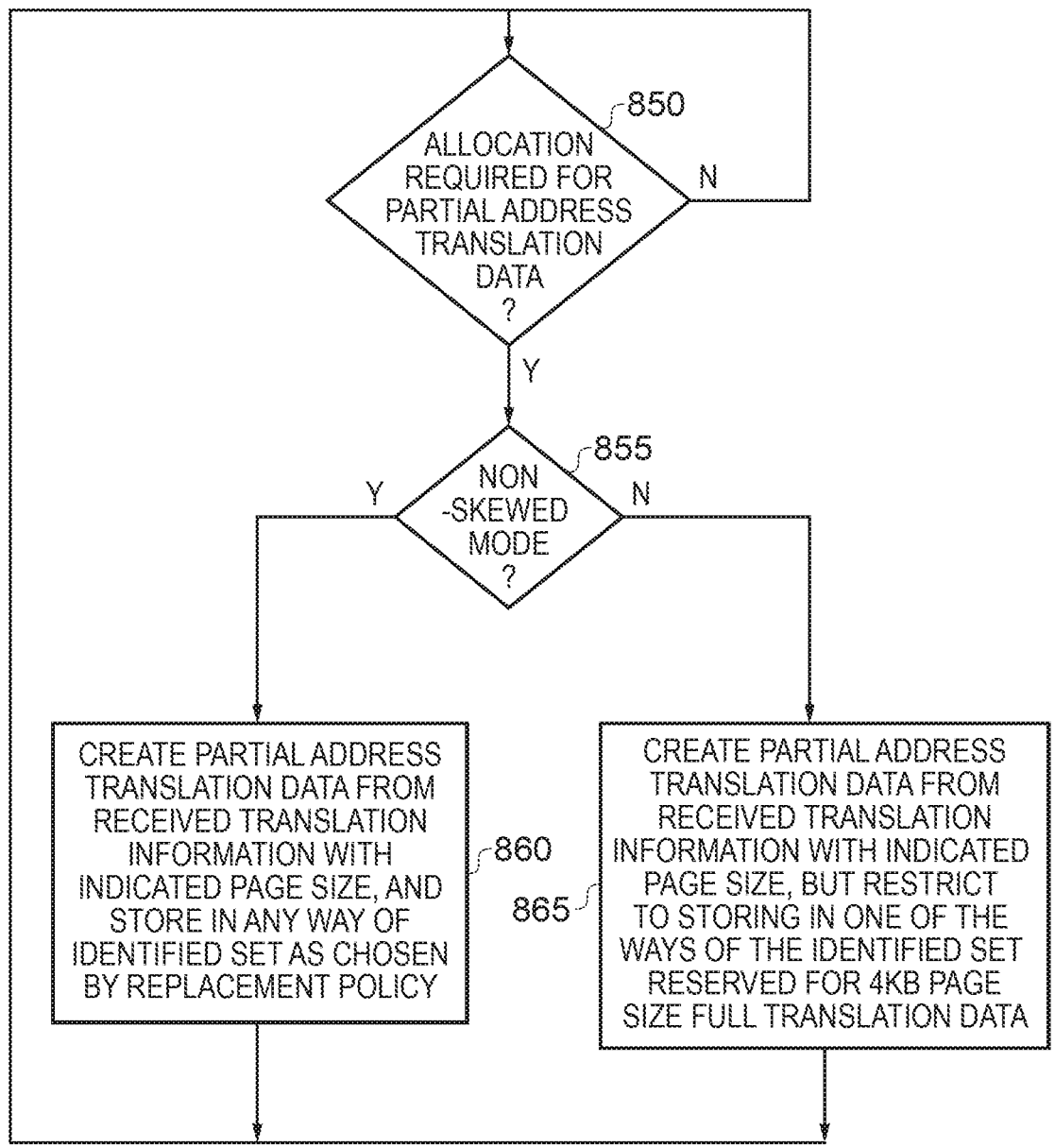
FIG. 13 is a flow diagram illustrating the allocation process performed by the allocation circuitry of FIG. 5 for partial address translation data, in an embodiment where the address translation cache is a unified address translation cache capable of storing both full translation data and partial translation data.

In one such embodiment, the above described techniques are employed in respect of full address translation data, and as indicated in FIG. 13, partial address translation data is handled differently. In particular, as indicated at step 850, if the allocation circuitry determines that an entry needs to be allocated for partial address translation data, then at step 855 it is determined whether the apparatus is currently operating in the non-skewed mode. If so, then at step 860 the partial address translation data is created from the received translation information with the indicated page size and stored in any way of the identified set, as chosen by the replacement policy. Accordingly, in the non-skewed mode, no fracturing is required with regard to the partial address translation data, and the received translation information can effectively be used "as is" to form the partial address translation data. In particular, it will be appreciated that when performing a lookup for partial address translation data, timing is less critical, since even in the presence of a hit, one or more page table walk processes will also be needed before the final address translation can be determined, and accordingly there will be significant time involved in translating a virtual address where only a partial address translation data hit is detected within the address translation circuitry 20. Accordingly, to increase the effective capacity for partial address translations, the mechanism can allow partial address translation data of multiple different sizes to be stored within any of the ways of the identified set at step 860. When performing a lookup operation for partial address translation data, it may then be necessary to perform multiple sequential lookups in order to check for each possible page size.

However, if it is determined that the apparatus is operating in one of the skewed modes, then as indicated by step 865, the way or ways that have been reserved for full address translation data of a larger size are ring fenced so that they cannot be used for a partial address translation data. In particular, at step 865, the partial address translation data is still created from the received translation information with the indicated page size of the received translation information, but it is restricted to be stored in one of the ways of the identified set that are reserved for 4 KB page sized full translation data. Hence, any way that is reserved for larger page sizes for full translation data do not have entries populated with partial address translation data.

In one embodiment, when a new virtual address is received from the core 10, the lookup circuitry may first perform a lookup for full address translation data, and if there is a miss, it can then initiate the required sequence of lookups for partial address translation data.

As per the above described embodiments, the non-skewed and skewed modes of operation are arranged so as to seek to optimise lookup performance when handling full address translation data. In particular, in the non-skewed mode, the allocation circuitry may be arranged so that all full address translation data allocated into the address translation cache relates to the same page size, thereby enabling a single lookup to be performed. In a skewed mode, particular ways can be reserved for particular page sizes, allowing multiple lookups to be performed in parallel, so as to maintain the speed of the lookup operation. However, in other embodiments, it may be determined that increasing the effective capacity of the address translation cache is more of a concern the maintaining quick lookup times. In that case, the allocation policy applied in at least the non-skewed mode of operation can be altered.

For example, in one embodiment, in the non-skewed mode, the allocation circuitry may be arranged to permit full address translation data to be produced for the page size associated with the received translation information and to be allocated to any of the ways. When the apparatus is in the non-skewed mode of operation, the lookup circuitry may then be arranged to perform a series of lookups for full address translation data, each lookup assuming a page size different to each other lookup, until either a hit has been detected or a lookup has been performed for each page size. By such an approach, preference can be given to increasing the effective capacity of the address translation cache rather than maintaining quick lookup times. Hence, when the time taken by the lookup is not considered to be critical, it would be possible to operate the apparatus in the non-skewed mode, but when it is determined that the timing of the lookup operations is important, the apparatus could switch to a skewed mode of operation. If the skewed mode operates as described in the earlier embodiments, then the skewed mode in this instance has a reduced effective capacity compared with the variant of the non-skewed mode described above.

In a yet further embodiment, a hybrid approach could be taken. For example, in one embodiment, when in the non-skewed mode, the allocation circuitry may be arranged to produce the address translation data for a first page size (e.g. a 4 KB page size) when the page size associated with the received translation information is one of a plurality of page sizes within a first group of page sizes, and otherwise may be arranged to permit the address translation data to be produced for the page size associated with the received translation information. In accordance with such a technique, for the page sizes within the first group, fracturing may be performed as required in order to produce address translation data of one specified size, but for a page size not in that first group the allocation circuitry will allow the address translation data to be allocated with the page size of the associated received translation information, and during the lookup operation one or more sequential lookups can be performed for such a page size if needed. This allows a fast lookup to be maintained for address translation data derived for a particular page size, whilst address translation data associated with certain other page sizes may require a longer lookup.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
an address translation cache having a plurality of entries, each entry to store address translation data used when converting a virtual address into a corresponding physical address of a memory system, each address translation data having a page size indication for a page within the memory system that is associated with the address translation data;
allocation circuitry to perform an allocation process to determine the address translation data to be stored in each entry; and
mode control circuitry to switch a mode of operation of the apparatus between a non-skewed mode and at least one skewed mode dependent on a page size analysis operation;
the address translation cache being organised as a plurality of portions;
wherein in the non-skewed mode the allocation circuitry is arranged, when performing the allocation process, to permit the address translation data to be allocated to any of the plurality of portions;
wherein in each of the at least one skewed mode, the allocation circuitry is arranged, when performing the allocation process, to reserve at least one portion for allocation of address translation data associated with pages of a first page size and at least one other portion for allocation of address translation data associated with pages of a second page size different to said first page size;
wherein the allocation circuitry is arranged to determine, from received translation information, the address translation data to be stored in an allocated entry, the received translation information having an associated page size;
wherein in the non-skewed mode, the allocation circuitry is arranged to produce the address translation data for said first page size irrespective of the page size associated with the received translation information.

2. An apparatus as claimed in claim 1, wherein when the page size associated with the received translation information is larger than the first page size the allocation circuitry is arranged to perform a fracturing operation to produce the address translation data for the first page size from the received translation information.

3. An apparatus as claimed in claim 1, wherein the received translation information is obtained via a page table walk process.

4. An apparatus as claimed in claim 1, wherein said address translation cache is an N-way set associative cache and each of said portions comprises a way of said N-way set associative cache.

5. An apparatus as claimed in claim 1, further comprising:
lookup circuitry responsive to a received virtual address to perform a lookup operation within the address translation cache to determine whether address translation data for that virtual address is stored within an entry of the address translation cache;
wherein, when the apparatus is in said at least one skewed mode of operation, the lookup circuitry is arranged to perform in parallel a lookup within said at least one portion for address translation data associated with pages of said first page size and a lookup within said at least one other portion for address translation data associated with pages of said second page size.

6. An apparatus as claimed in claim 5, wherein:
said address translation cache is an N-way set associative cache, each of said portions comprises a way of said N-way set associative cache; and
the lookup circuitry is arranged to select a first subset of bits of the virtual address to identify a set to be subjected to the lookup within said at least one portion for address translation data associated with pages of said first page size, and to select a second subset of the bits of the virtual address to identify a set to be subjected to the lookup within said at least one other portion for address translation data associated with pages of said second page size.

7. An apparatus as claimed in claim 1, wherein said first page size is smaller than said second page size.

8. An apparatus as claimed in claim 7, wherein said first page size is a smallest page size supported by the memory system.

9. An apparatus as claimed in claim 1, wherein:
the allocation circuitry is arranged to determine, from received translation information, the address translation data to be stored in the allocated entry, each instance of the received translation information having an associated page size; and
the mode control circuitry is arranged to perform, as said page size analysis operation, a monitoring operation that monitors the page sizes associated with multiple instances of the received translation information.

10. An apparatus as claimed in claim 9, wherein:
the mode control circuitry is arranged to switch to one of said at least one skewed modes when a proportion of page sizes greater than said first page size exceeds a predetermined level for said multiple instances of the received translation information.

11. An apparatus as claimed in claim 9, wherein the mode control circuitry is further arranged, when performing said page size analysis operation, to take into account a history of page sizes associated with items of address translation data for which a hit has been detected within the address translation cache.

12. An apparatus as claimed in claim 2, wherein:
the address translation cache is a set associative translation lookaside buffer (TLB) for associated processing circuitry, and is coupled to a fully associative micro-TLB, in response to a virtual address issued by the processing circuitry the address translation cache being accessed when a miss is detected in the micro-TLB; and
the micro-TLB is arranged to store address translation data for the page size indicated by the received translation information, independent of whether the allocation circuitry of the address translation cache performs said fracturing operation.

13. An apparatus as claimed in claim 1, wherein:
said address translation cache is a unified translation cache, said address translation data comprising a final level type of address translation data that identifies a full translation from the virtual address to the physical address, and the address translation cache also being arranged to store at least one intermediate level type of address translation data that identifies a partial translation of the virtual address.

14. An apparatus as claimed in claim 13, wherein:
the allocation circuitry is arranged to determine, from received translation information, the intermediate level type of address translation data to be stored in an allocated entry, the received translation information having an associated page size; and
the allocation circuitry is arranged to permit the intermediate level type of address translation data to be stored in the allocated entry for the page size of the associated received translation information irrespective of the mode of operation.

15. An apparatus as claimed in claim 14, wherein when the apparatus is in said at least one skewed mode, the allocation circuitry is arranged to prevent the intermediate level type of address translation data being stored in an entry within said at least one other portion reserved for allocation of said final level type of address translation data associated with pages of the second page size.

16. An apparatus as claimed in claim 1, wherein:
when in the at least one skewed mode of operation, the allocation circuitry is arranged, when allocating an item of address translation data associated with a page of said second page size, to apply a replacement policy to determine whether to overwrite, within an entry of said at least one other portion, another item of address translation data associated with said second page size, or whether to apply a fracturing operation to produce address translation data for said first page size to be stored within an entry of said at least one portion.

17. An apparatus as claimed in claim 1, wherein said at least one skewed mode comprises multiple skewed modes, including a skewed mode that additionally reserves at least one further portion for allocation of address translation data associated with pages of a third page size different to said first and second page sizes.

18. An apparatus as claimed in claim 1, wherein:
the allocation circuitry is arranged to determine, from received translation information, the address translation data to be stored in the allocated entry, the received translation information having an associated page size;
in the non-skewed mode, the allocation circuitry is arranged to permit the address translation data to be produced for the page size associated with the received translation information and to be allocated to any of the plurality of portions;
the apparatus further comprising lookup circuitry responsive to a received virtual address to perform a lookup operation within the address translation cache to determine whether address translation data for that virtual address is stored within an entry of the address translation cache;

wherein, when the apparatus is in said non-skewed mode of operation, the lookup circuitry is arranged to perform a series of lookups for address translation data, each lookup assuming a page size different to each other lookup, until either a hit has been detected or a lookup has been performed for each page size.

19. An apparatus as claimed in claim 1, wherein:
the allocation circuitry is arranged to determine, from received translation information, the address translation data to be stored in the allocated entry, the received translation information having an associated page size;
in the non-skewed mode, the allocation circuitry is arranged to produce the address translation data for said first page size when the page size associated with the received translation information is one of a plurality of page sizes within a first group of page sizes, and otherwise is arranged to permit the address translation data to be produced for the page size associated with the received translation information.

20. A method of operating an address translation cache having a plurality of entries and organised as a plurality of portions, each entry for storing address translation data used when converting a virtual address into a corresponding physical address of a memory system, each address translation data having a page size indication for a page within the memory system that is associated with the address translation data, the method comprising:

performing an allocation process to determine the address translation data to be stored in each entry; and switching a mode of operation of the apparatus between a non-skewed mode and at least one skewed mode dependent on a page size analysis operation;

when performing the allocation process whilst in the non-skewed mode, permitting the address translation data to be allocated to any of the plurality of portions; and when performing the allocation process whilst in the at least one skewed mode, reserving at least one portion for allocation of address translation data associated with pages of a first page size and at least one other portion for allocation of address translation data associated with pages of a second page size different to said first page size;

determining, from received translation information, the address translation data to be stored in an allocated entry, the received translation information having an associated page size; and when in the non-skewed mode, producing the address translation data for said first page size irrespective of the page size associated with the received translation information.

* * * * *